United States Patent [19]

Suzuki et al.

[11] Patent Number: 4,787,711
[45] Date of Patent: Nov. 29, 1988

[54] ON-VEHICLE HEAD UP DISPLAY DEVICE WITH OPTICAL MEANS FOR CORRECTING PARALLAX IN A VERTICAL DIRECTION

[75] Inventors: Yoshiyuki Suzuki; Tatsumi Ohtsuka; Tadashi Iino, all of Susono; Akihisa Kasahara; Noriyasu Tomiyama, both of Tokorozawa, all of Japan

[73] Assignee: Yazaki Corporation, Tokyo, Japan

[21] Appl. No.: 907,148

[22] Filed: Sep. 12, 1986

[30] Foreign Application Priority Data

Jan. 23, 1986 [JP] Japan .................................. 61-11123
Mar. 28, 1986 [JP] Japan .................................. 61-68467

[51] Int. Cl.⁴ .......................... G02B 27/10; G02B 5/04
[52] U.S. Cl. ...................................... 350/174; 350/286
[58] Field of Search ........................ 350/174, 173, 286

[56] References Cited

U.S. PATENT DOCUMENTS

| | | | |
|---|---|---|---|
| 1,787,269 | 12/1930 | Hansen | 350/173 |
| 3,778,548 | 12/1973 | Nistri | 350/174 |
| 3,887,273 | 6/1975 | Griffiths | 350/174 |
| 3,899,241 | 8/1975 | Malobicky et al. | 350/174 |
| 3,940,204 | 2/1976 | Withrington | 350/174 |
| 3,942,901 | 3/1976 | Ekstrand | 350/174 |
| 4,167,113 | 9/1979 | Mann | 350/174 |
| 4,447,128 | 5/1984 | Ferrer | 350/174 |
| 4,530,564 | 7/1985 | Close | 350/174 |
| 4,582,389 | 4/1986 | Wood et al. | 350/174 |
| 4,613,200 | 9/1986 | Hartman | 350/174 |
| 4,632,508 | 12/1986 | Connelly | 350/174 |

Primary Examiner—Jon W. Henry
Attorney, Agent, or Firm—Lowe, Price, LeBlanc, Becker & Shur

[57] ABSTRACT

In an on-vehicle head up display device employing a catoptric system for a windshield glass of an automobile to project a display image onto an inner surface of the windshield glass is adapted to make an angle formed by image of the display image of a display means enter the windshield glass is adapetd to make an angle formed by light beams of the virtual image entering the windshield glass less than a monocular resolving power. Further, an optical means for correcting parallax of the light beams of the virtual image is provided between the optical system and the windshield glass. Thus, a double image formation and binocular parallax may be eliminated.

2 Claims, 6 Drawing Sheets

FIG. 20

ON-VEHICLE HEAD UP DISPLAY DEVICE WITH OPTICAL MEANS FOR CORRECTING PARALLAX IN A VERTICAL DIRECTION

BACKGROUND OF THE INVENTION

The present invention relates to an on-vehicle head up display device, and more particularly to an on-vehicle head up display device utilizing a windshield glass of an automobile and indicating various information with use of a virtual image optical system.

There has been proposed a device for indicating a vehicle speed, time, engine rotational speed and other information by utilizing reflection on an inner surface of the windshield glass of the automobile and forming a virtual image at a front position of the windshield glass. Such a device is called an on-vehicle head up display device (which will be hereinafter referred to as HUD).

Figure 1:
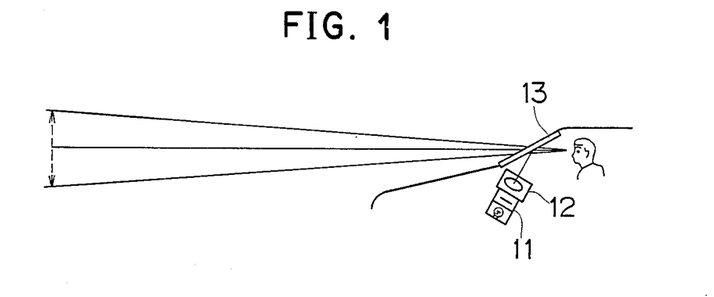
FIG. 1 is an illustration showing a fundamental construction of the HUD.
Figure 2:
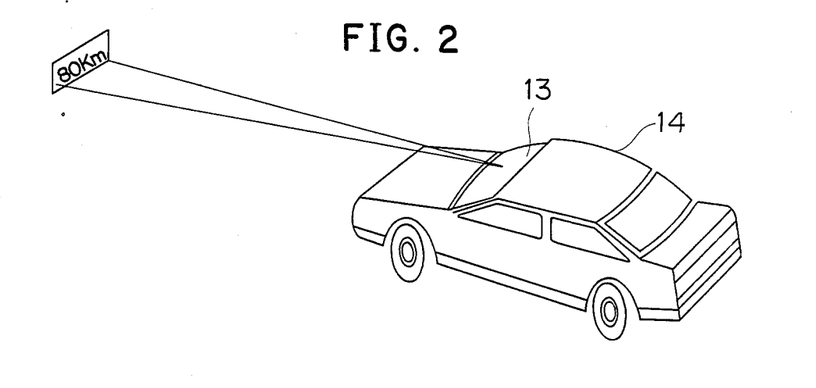
FIG. 2 is an illustration showing projection of a display image.

FIGS. 1 and 2 show a fundamental construction of the HUD in the prior art. As shown in FIG. 1, the HUD is constituted of a display unit 11 installed at a center position of a dash board, for example, a (dioptric) optical system 12 such as a lens, and a catoptric system using a windshield glass 13. The display unit 11 employs LED, LCD and the like. A small image of the display unit 11 is enlarged by the optical system 12 and the virtual image optical system formed by the windshield glass 13, and is formed as a virtual image at a front position of the windshield glass 13.

Accordingly, as shown in FIG. 2, the virtual image (indication of speed, in this case) indicated by the display unit 11 of the HUD is perceived by a driver as if the display image were present at a fixed distance in front of an automobile 14.

An image formation technique such that display information by LED or LCD and image information such as visible framework are formed in a fixed optical field is traditionally used in a camera finder, for example. A technique in the HUD is basically similar to such a display technique as mentioned above. However, the technique in the HUD includes some problems to be solved in such a point that the windshield glass is used as the catoptric system.

Figure 3:
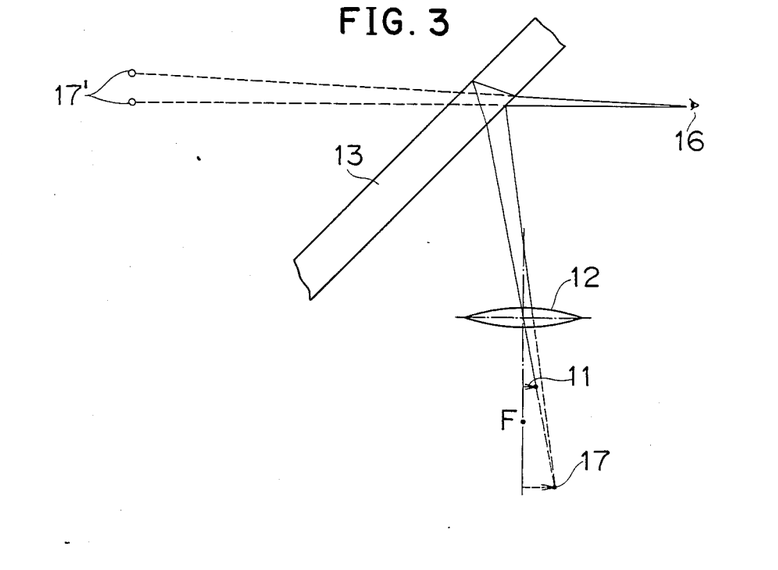
FIG. 3 is an illustration showing generation of a double image on a windshield glass.

One of the problems is caused by the use of the windshield glass as a half mirror having a relatively high transmittance. As shown in FIG. 3, light beam directed from a point on the display unit 11 through the optical system 12 to the windshield glass 13 is reflected on two interfaces between air and glass on the outside and inside of the automobile. Further, as the optical system of the HUD is primarily provided on the dash board, it is necessary to set large an incident and reflective angle to the windshield glass. As a result, reflective images as reflected on the two reflective surfaces are slipped to generate perception of a double image.

Namely, referring to FIG. 3, the light generated from a point on the display unit 11 is allowed to enter the windshield glass in the form of beam from an object point 17 on a virtual image formed by the optical system 12. Therefore, the beam is reflected on the two reflection interfaces of the windshield glass 13, and is allowed to enter driver's eyes 16 along two paths as shown by solid lines. This is caused by refraction at the interface between glass and air on the outside of the windshield glass. Owing to such a slip of the light path, the virtual image of the object point 17 is perceived double as shown by numerals 17'', and accordingly, the driver cannot visibly perceive a clear display image.

To solve this problem, it is considered that the windshield glass is treated by coating to form a mirror or half mirror having a high reflectance on an inner surface of the windshield glass. However, it is undesirable in traffic safety to provide such a mirror portion for the windshield glass of the automobile in the vicinity of the dash board. Specifically, a lower area of the windshield glass plays an important role for the driver since he watches a fender part of the vehicle body so as to grasp a condition of the vehicle body. Therefore, if the visibility of the lower area of the windshield glass is hindered, the drivability is very reduced. Furthermore, poor visibility of the windshield glass causes hindrance in quick perception of any obstacle existing in front of the automobile, resulting in traffic danger.

In addition to the aforementioned problem of double image due to double reflection, there exists another problem of binocular parallax generated primarily in dependence upon a direction of reflection.

Figures 4, 5:
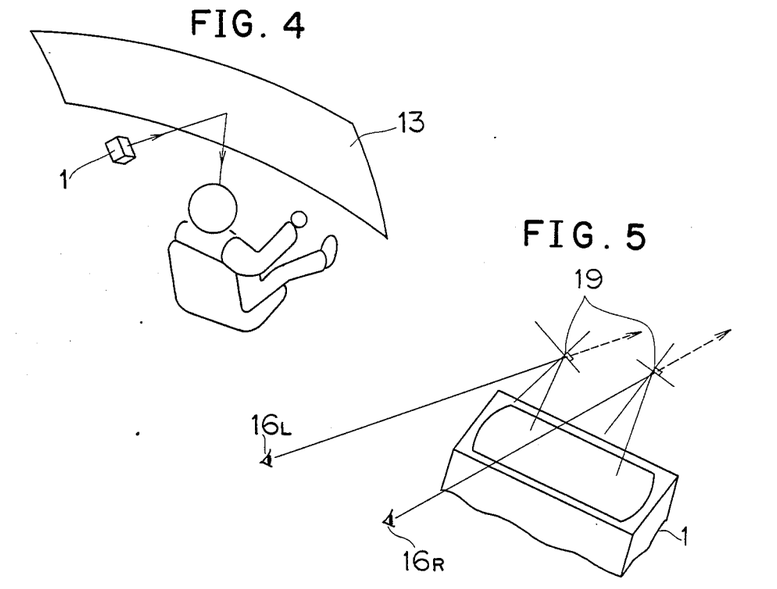
FIGS. 4 to 8 show illustrations showing generation of binocular parallax in the HUD.

As shown in FIG. 4, a HUD unit 1 including the display unit and the optical system is located at a central position of the dash board, and a virtual image is reflected to the driver sitting on a driver's seat of the automobile. In this case, as shown in FIG. 5, reflective points 19 on the windshield glass of the same virtual image reaching a right eye 16R and a left eye 16L of the driver are present at different positions because of binocular parallax.

Figure 6:
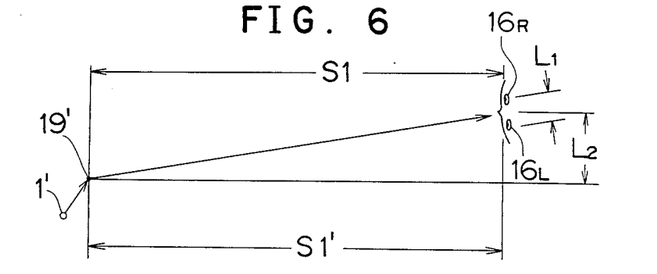

FIG. 6 shows a plan view of arrangement of the driver's eyes 16R and 16L, the HUD unit (shown as an object point 1') and the reflective points on the windshield glass.

Provided that the windshield glass is a plane glass for ease of explanation, there will be now described a problem under the following conditions.

Figure 7:
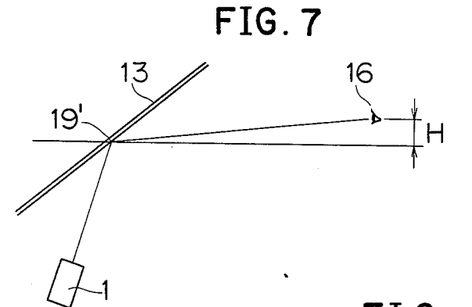

Referring to FIG. 6, an average distance L1 between the right and left eyes is about 70 mm, and a distance S1' between a center position between both the eyes 16L and 16R and a middle point between the reflective points on the windshield glass is about 850 mm. Further, as shown in FIG. 7, the virtual image is directed from the HUD unit 1 on a lower side of the eyes, and a vertical difference H between a middle point 19' between the reflective points and the eyes is about 30 mm. A distance L2 between a longitudinal line passing through the middle point 19' and the central position of both the eyes is about 210 mm. The windshield glass is inclined by 28 degrees at the middle point 19' with respect to a horizontal plane.

In other words, light beam from the HUD unit 1 located at a lower position on a left-hand side (in case of a right steering wheel) is allowed to enter the windshield glass, and the reflective light advances toward the eyes present at an upper position on a right-hand side of the reflective points.

Figures 8, 9, 10, 11:
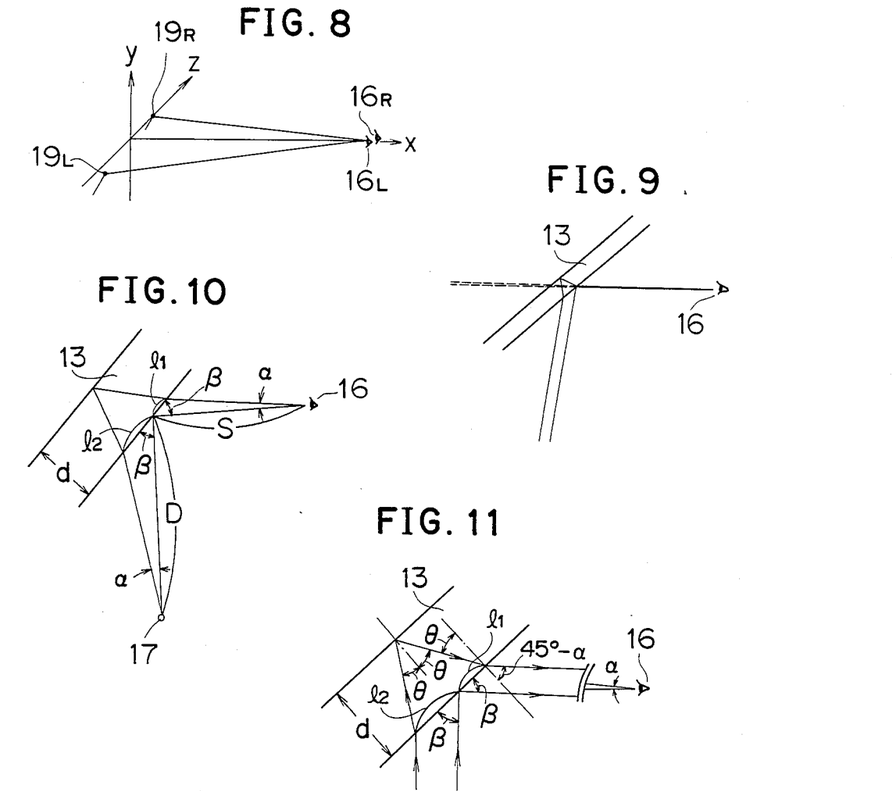
FIG. 9 is a schematic illustration showing a double reflection preventing technique according to the present invention.
FIGS. 10 and 11 are illustrations showing a fundamental principle of a double image preventing technique according to the present invention.

Under the aforementioned conditions, as shown in FIG. 8, a left reflective point 19L is slipped to a left lower position from a right reflective point 19R with respect to a plane formed by a y-axis extending in a vertical direction and a z-axis extending along a transverse direction of the automobile. In this case, when the reflective points 19L and 19R are projected onto the y-z plane, a vertical difference between the reflective points 19L and 19R is 7.5 mm, while a transverse difference therebetween is 66.5 mm.

As calculated from the conditions set forth above in conjunction with FIG. 6, that is,, the distance S1' (850 mm), the vertical difference H (30 mm) and the distance L2 (210 mm), a straight distance S1 between the central position of both the eyes and the reflective points is 876 mm. In this case, binocular parallax $\theta$ (=$\tan^{-1}$ (7.5/876)) in the vertical direction owing to the vertical difference of 7.5 mm between the reflective points.

Consequently, the reflective image on the windshield glass is perceived double because of the aforementioned binocular parallax, which is naturally dependent upon a transverse dimension of the image. Basically, it is hard to adjust the human eyes in the vertical direction, and accordingly, if the identical image is received by the eyes for a long time with such binocular parallax, there will occur eye strain to create a serious problem from the viewpoint of prevention of danger. Further, although curvature of the windshield glass in the vertical and transverse directions is not taken into consideration as to the binocular parallax in the foregoing description, it will be appreciated that the slip of the virtual image is increased in the case that the curavture is considered.

As is described above, the HUD utilizing the windshield glass as a reflecting means has the problems of double reflection and binocular parallax. Unless the problems are solved, a clear display image cannot be visible perceived by the driver without eye strain.

SUMMARY OF THE INVENTION

Accordingly, it is a primary object of the present invention to provide an on-vehicle head up display device using a windshield glass as a reflection means, which enables a driver to visibly perceive a clear display image without eye strain.

It is another object of the present invention to provide an on-vehicle head up display device which may eliminate double reflection.

It is a further object of the present invention to provide an on-vehicle head up display device which may eliminate binocular parallax.

It is a still further object of the present invention to provide an on-vehicle head up display device which enables a driver to always visibly perceive an overall display image.

It is a still further object of the present invention to provide an on-vehicle head up display device which is compact and of a short depth.

The on-vehicle head up display device according to the present invention using a windshield glass of an automobile as a catoptric system to project a display image onto an inner surface of the windshield glass comprises a display means for indicating various information and an optical system for letting a virtual image of the display image indicated by the display means enter the windshield glass. The optical system is designed in such that an angle of light beam of the virtual image incident upon the windshield glass is not more than a monocular resolving power on the basis of reflective conditios of the windshield glass.

Accordingly, a double image of the virtual image entering the windshield glass is not perceived by a driver, but a clear and high-quality display image may be visibly perceived by the driver.

The on-vehicle head up display device according to the present invention further comprises an optical means arranged between the optical system and the windshield glass to correct parallax of light beam of the virtual image reflected on the windshield glass. Accordingly, eye strain due to binocular parallax is not generated, but a clear and high-quality display image may be visibly perceived by the driver. Further, high drivability and safety may be imparted to the automobile.

DETAILED DESCRIPTION OF THE PREFERRED EMBODIMENTS

There will be now described a preferred embodiment of the present invention with reference to the drawings.

PREVENTION OF DOUBLE REFLECTION

First, described is a technique for eliminating influence of double reflection on a windshield glass.

Beams of light incident upon the windshield glass are intended to be nearly parallel to each other, so as to reduce the influence of the double reflection on the windshield glass. For instance, if a reflective image enters the windshield glass from a point at infinity (or a far point near infinity), beams of incident light become nearly parallel to each other as shown in FIG. 9, and an apparent distance of the image becomes infinite. As a result, parallax of beams reflected on two interfaces of the windshield glass 13 is decreased. If the parallax is suppressed within a resolving power of a human eye 16 (monocular), that is, within 2 to 5 minutes, a double image as slipped is not perceived.

The distance between a virtual image and the human eye for the purpose of elimination of perception of the double image is obtained in the following manner.

FIG. 10 shows light beams of an object point 17 incident upon the windshield glass 13 and reflected light beams directed to the eye 16 with respect to two reflective interfaces of the windshield glass 13. The light beams reflected on the two interfaces take different paths. An angle formed by each of two light beams on the incident side and the reflective side is represented by $\alpha$. An incident and reflective angle measured on the inside interface of the windshield glass is represented by $\beta$. A distance between a reflective point on the inside interface of the windshield glass and an incident point of the beam directed to the inside interface is represented by $l_1$, while a distance between the reflective point and an incident point of the beam directed to an outside interface of the windshield glass is represented by $l_2$. Further, a distance between the object point 17 and the reflective point on the inside interface of the windshield glass is represented by D, while a distance between the reflective point and a eye 16 is represented by S. Then, the following equation is obtained by the law of sines.

$$\frac{S}{\sin\{180° - (\alpha + \beta)\}} = \frac{l_1}{\sin\alpha} \qquad (1)$$

$$\frac{D}{\sin\{180° - (\alpha + \beta)\}} = \frac{l_2}{\sin\alpha} \qquad (2)$$

From the above equations, $l_1/S = l_2/d$ is obtained. Therefore, the following equation is obtained.

$$l_1/l_2 = S/D \qquad (3)$$

Assuming that S is constant, that is, a driving position of a driver is fixed, if $D \to \infty$, $l_1/l_2 \to 0$ is given. In other words, the more D increases, the smaller $l_1$ becomes, and the angle $\alpha$ is also decreased.

Assuming that a thickness of the windshield glass 13 is 5 mm, and a refractive index of the windshield glass 13 is 1.5, it is studied to obtain $\alpha = 0.08°$ corresponding to a substantially maximum value, 4.8 minutes in a dispersion of the monocular resolving power if $\beta = 45°$. Referring to FIG. 11, a reflective angle $\theta$ on the outside interface of the windshield glass is given by the low of refraction in the following manner.

$$\theta = \sin^{-1}\left(\frac{\sin(45° - \alpha)}{n}\right) \qquad (4)$$

$$l_1 + l_2 = 2d \cdot \tan\theta \qquad (5)$$

From the above equations, $l_1 + l_2 = 5.34$ mm is given, and $l_1 = 1.35$ mm is given from Equation (1). Therefore, $l_2 = 3.99$ mm is given. Accordingly, D = 2020 mm is given from Equation (3).

Consequently, in order to obtain $\alpha = 0.08°$ corresponding to 4.8 minutes if the thickness of the windshield glass 13 is 5 mm, and the refractive index is 1.5, and the incident angle from a HUD unit is 45°, it is required to take the distance of about 2020 mm between the object point (or a virtual image) and the windshield glass 13.

In the case of obtaining the same angle $\alpha$ with the incident angle $\beta$ from the HUD unit made smaller, e.g., $\beta = 30°$, D = 580 mm is given by the same manner as the above. Further, in the case that the angle $\alpha$ is reduced to 0.035° corresponding to a minimum value, 2.1 minutes of the monocular resolving power, D = 2190 mm is given with $\beta = 30°$.

The foregoing setting is merely one example for explaining the theory of elimination of double images, and as there are actually included difference in the driver's seat position and front and rear margins for seat adjustment, a proper distance D is naturally dependent upon an automobile on which the device is mounted. To obtain the effect of prevention of the double image, the distance D may be required to be more than the range of 500 to 2000 mm under the condition of a general driving position, installation position of the device and angle of the windshield glass. Naturally, if the distance D exceeds this distance, and approaches to infinity, the double image is eliminated.

Although there is proposed in the HUD a system such that an image of LCD, etc. is directed to enter the windshield glass directly, it is actually unable to locate a display image at a point in the above-mentioned range in view of a vehicle body size. Therefore, in this embodiment, a vitural image of the display image is let enter the windshield glass with use of an optical system of the HUD unit, and the distance between the virtual image and the windshield glass is extended to a far point where the double image is not perceived.

Figure 12:
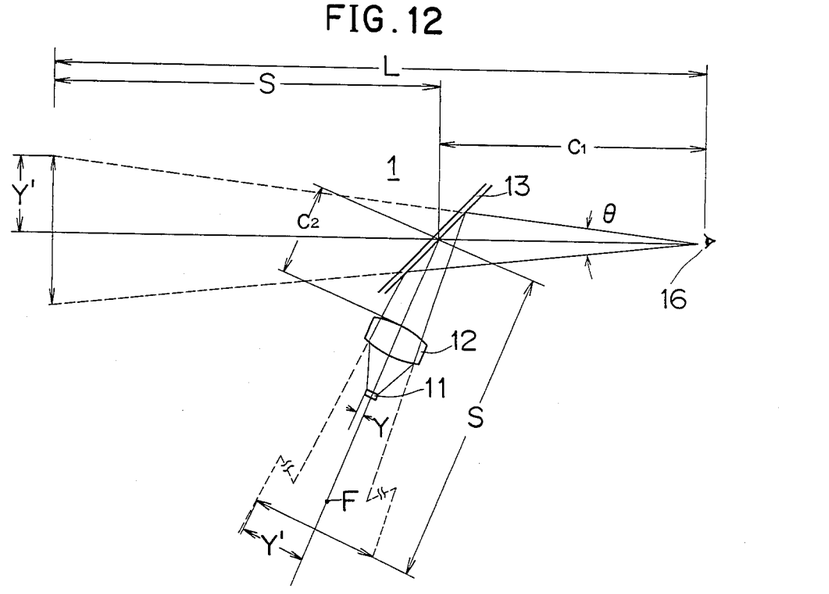
FIG. 12 is a schematic illustration showing an arrangement of the HUD according to the present invention.

FIG. 12 shows only a display unit 11 formed by an LCD unit and an optical system 12 for the purpose of simplicity of the HUD unit 1, in which a housing of the HUD unit, a dash board and the other elements are omitted. The display unit 11 is arranged on a light axis of the optical system 12. The light axis of the optical system 12 is arranged so as to reflect the virtual image of the display image of the display unit 11 from a position below the inclined windshield glass 13 having curvature R to a driver's eye existing at a substantially horizontally rear position.

For the purpose of simplicity of explanation, the windshield glass is regarded as a plane glass. Further, it is assumed that a distance between the eye 16 and the virtual image present at a front position of the windshield glass 13 is L; a distance between the eye 16 and the windshield glass 13 is $C_1$; a distance between the optical system 12 and the windsheild glass 13 is $C_2$; and a distance between the windshield glass 13 and the virtual image is S. As the windshield glass 13 is assumed to be plane, it is not necessary to take magnification of the windshield glass 13 into consideration. Further, as the light axis is merely bent by the windshield glass 13, a distance between the windshield glass 13 and the virtual image formed on a rear side of the display unit 11 and the optical system is equal to the distance S between the windshield glass 13 and the virtual image formed on a front side of the windshield glass 13. Further, a size of both the virtual images is also equal to each other.

Figure 13:
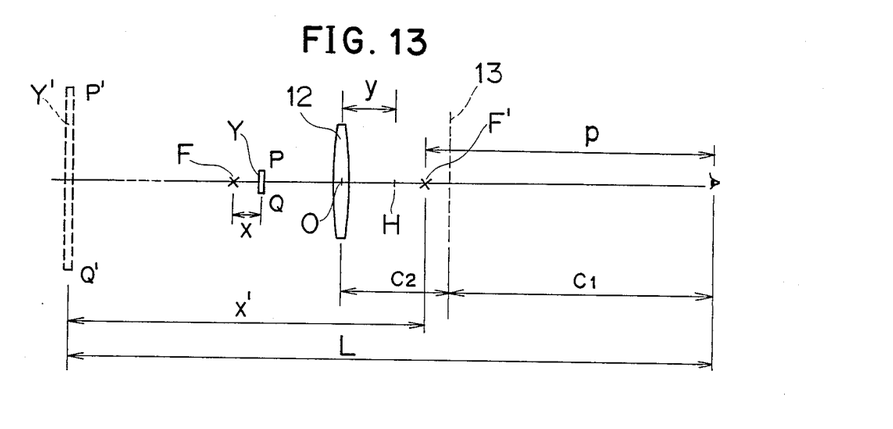
FIG. 13 is an illustration showing a virtual image optical system of the device shown in FIG. 12.

The above-mentioned constitution is equivalent to that shown in FIG. 13 if invertion of the image by the windshield glass is ignored. In the case that an erecting virtual image is intended to be obtained with the constitution shown in FIG. 13, an object PQ (corresponding to the display unit 11) having a size Y is located at a distance x inside of a focal point F of the optical system 12, while the eye is located at a distance p outside of a focal point F'. Assuming that a distance between the eye and a virtual image P'Q' of the object is represented by L, and a distance between the focal point F' and the virtual image P'Q' is represented by x', a lateral magnification $\beta$ is given by the following equation.

$$\beta = \frac{Y'}{Y} = \frac{f}{x} \qquad (6)$$

The distance $x'$ is given by the following equation with respect to a focal distance $f$ and the distance $x$ between the object PQ and the focal point F.

$$x' = f^2/x \tag{7}$$

Since the distance $x'$ is also represented by $x' = L + p$, this equation is solved for L to give the following solution.

$$L = p + f^2/x \tag{8}$$

As is apparent from Equation (8), the distance L is dependent upon not only the focal distance of the optical system and the position of the object, but also the position of the driver. Therefore, it is necessary to consider the position of the driver, so as to set an apparent distance of the image.

Accordingly, in the following equation as modified from Equation (8), x may be obtained by setting a value of L required for eliminating the double image, and determining p and f.

$$x = \frac{f^2}{L - p} \tag{9}$$

Then, the display unit 11 is located at the distance x as obtained to provide the on-vehicle HUD which may elimiante the double image.

However, the windshield glass is generally so curved as to project toward a front side of an automobile, and functions as a concave mirror. In the aforementioned device, no curvature of the windshield glass is taken into consideration. Therefore, even if the distances f and x in Equation (8) are set so as to form a display image at a predetermined distance, the double image cannot be effectively eliminated as desired.

Figures 14, 16:
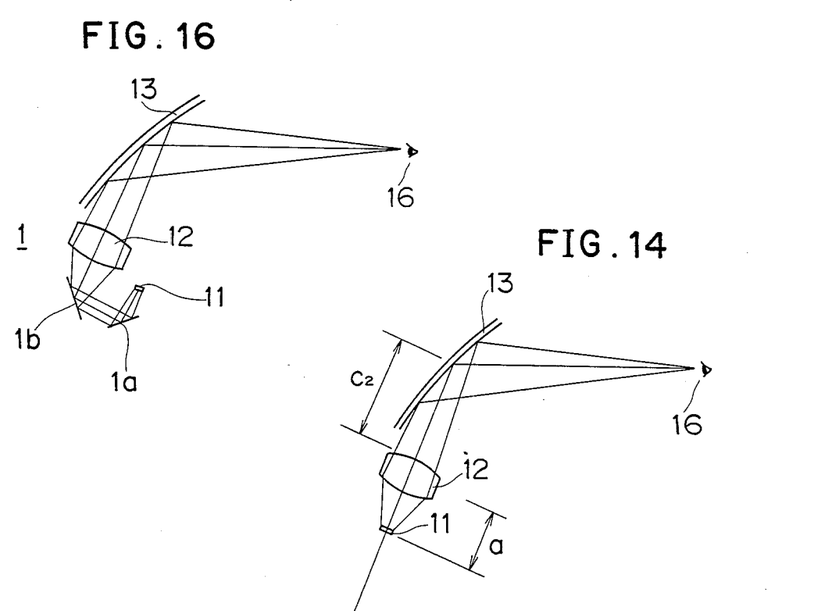
FIG. 14 is a schematic illustration showing the arrangement of the HUD according to the present invention when applied to a windshield glass having curvature.
FIG. 16 is an illustration showing a modified embodiment of the device shown in FIG. 14.
Figure 15:
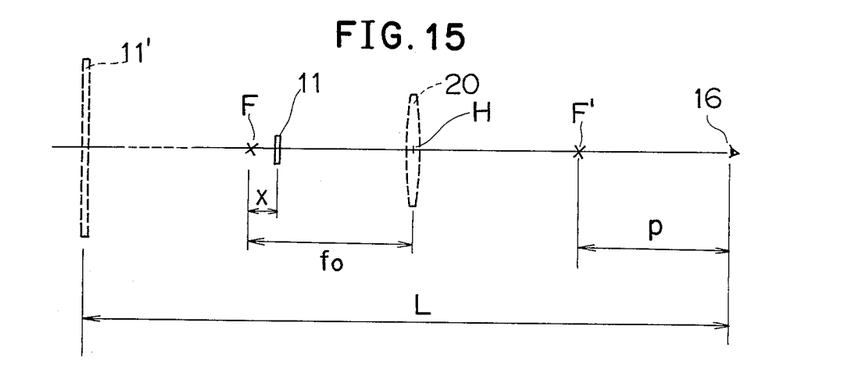
FIG. 15 is an illustration showing a virtual image optical system of the device shown in FIG. 14.

In the case that the windshield glass 13 having curvature is used as a catoptric system as shown in FIG. 14, the optical system 12 and the windshield glass 13 are synthesized with each other to obtain a synthetic optical system 20 as shown in FIG. 15 which is equivalent to FIG. 14. Then, obtained are a synthetic focal distance $f_0$ of the synthetic optical system 20 and a distance y between a center point H of the synthetic optical system 20 and a center point O of the optical system 12 shown in FIG. 13 so as to determine a mounting position of the display unit 11.

The windshield glass 13 having curvature R functions as a lens having a focal distance R/2. The synthetic focal distance $f_0$ obtained by synthesizing the windshield glass 13 and the optical system 12 having a focal distance f' may be given by the following equation.

$$\frac{1}{f_0} = \frac{1}{f'} + \frac{2}{R} - \frac{2 \cdot C_2}{f' \cdot R} \tag{10}$$

The distance y may be given by the following equation.

$$y = \frac{2 \cdot C_2 \cdot f_0}{R} \tag{11}$$

In the on-vehicle HUD shown in FIG. 14, assuming that the focal distance f' of the optical system 12 is 200 mm, and the curvature R of the windshield glass 13 is 5000 mm, and the distance $C_2$ between the optical system 12 and the windshield glass 13 is 350 mm, the synthetic focal distance $f_0$ of the synthetic optical system 20 shown in FIG. 15 may be obtained by substituting these values into Equation (10) as follows:

$$\frac{1}{f_0} = \frac{1}{200} + \frac{2}{5000} - \frac{2 \times 350}{200 \times 5000}$$

$$= 4.7 \times 10^{-3}$$

Therefore, $f_0 = 213$ mm is obtained. Similarly, the distance y may be obtained by substituting the above values into Equation (11) as follows:

$$y = \frac{2 \times 350 \times 213}{50000} \approx 29.8 \text{ mm}$$

Therefore, the position of the synthetic optical system 20 is determined at the distance of about 29.8 mm from the optical system 12.

Further, assuming that L is 20,000 mm, and the distance $C_1 + C_2$ between the optical system 12 and the driver's eye 16 is 813 mm, $p = 600$ is obtained, and x is obtained from Equation (9) as follows:

$$x = \frac{213^2}{20000 + 600} = 2.3 \text{ mm}$$

Therefore, it is necessary to locate the display unit 11 at the distance of 2.3 mm from the focal point F of the synthetic optical system 20 to the optical system 12.

In summary, the apparent distance capable of suppressing image slip created by the double reflection on the windshield glass to a level less than the monocular resolving power is first obtained from each position of the windshield glass, the driver and the HUD unit. Then, the constitution of the optical system and the distance between the optical system and the display unit are determined.

In this manner, the apparent distance of about 20 m for the virtual image by the HUD may be obtained to thereby reduce the slip of the double image created by the double reflection on the windshield glass to such a degree that the slip is not perceived. Especially, extension of the apparent distance is preferable in view of the fact that a watching point in driving is present at a distance relatively far away from the driver.

For the purpose of comparison between both the devices shown in FIGS. 13 and 15, the position of the display unit 11 of the HUD shown in FIG. 13 is obtained as follows:

$$x = \frac{200^2}{20000 - 600} \approx 2.1 \text{ mm}$$

As a result, the display unit 11 is located at the distance of 197.9 mm from the optical system 12. In the other embodiment of the invention using a curved windshield the on-vehicle HUD of the present invention, the display unit 11 is located at the distance of 180.9 mm from the optical system 12. Namely, the difference of 17 mm in the position of the display unit 11 is present between the two embodiments of the invention. The difference can cause incapabilities of formation of a virtual image at a desired far point and elimination of the double image. Unless the virtual image may be formed at a desired far point, there is a possibility that the driver cannot visibly perceive a display image at an apparent distance in driving.

The optical system preferably includes a large aperture lens so that the overall display image may be visibly perceived through the optical system even when a driver moves his head or adjusts his seat.

In the case that the distance a between the optical system and the display unit is required to be remarkably enlarged because of other conditions, and an overall length of the HUD unit is increased to the extent that it cannot be received in the dash board, mirrors 1a and 1b may be provided between the display unit 11 and the optical system 12 as shown in FIG. 16 so as to bend the light axis and decrease the overall length of the HUD unit.

PREVENTION OF BINOCULAR PARALLAX

There will be now described a technique for preventing binocular parallax.

As previously set forth with reference to FIGS. 5 and 6, the reflective point on the windshield glass of the light image of the HUD which enters the right and left eyes is slipped by 66.5 mm in a horizontal direction and 7.5 mm in a vertical direction, and the binocular parallax $\theta$ in the vertical direction is 0.49°.

As is appreciated from the fact that the binocular parallax in the horizontal direction provides stereoscopic vision, there will not occur so serious problem unless the horizontal slip of the reflective point is corrected. Accordingly, it is possible to obtain a satisfactory display image by correcting the binocular parallax in the vertical direction only even when oblique reflection is conducted.

In other words, the binocular parallax in the vertical direction will reference to FIGS. 5 and 6 may be eliminated by upwardly moving the reflective point for the left eye by the distance of 7.5 mm. As a result, the display image may be visuallized more clearly.

Figures 17, 18:
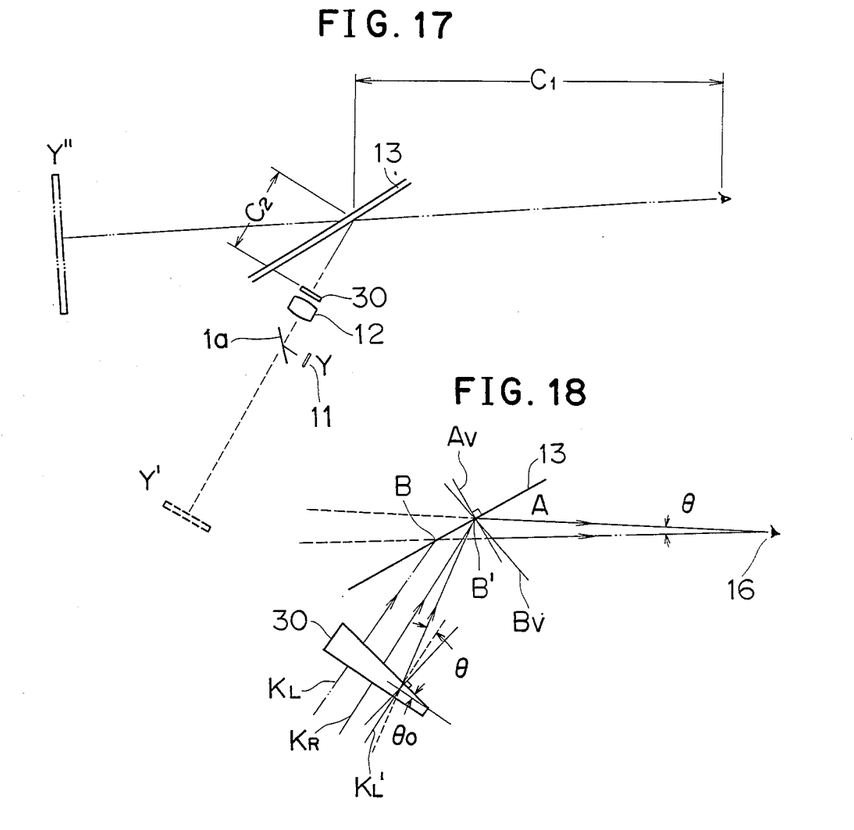
FIG. 17 is an illustration showing a modified embodiment of the HUD according to the present invention.
FIG. 18 is an illustration showing the operation of a prism shown in FIG. 17.

As shown in FIG. 17, the preferred embodiment employs a prism 30 to move light beam directed from the optical system of the HUD unit through the windshield glass to the left eye. In this embodiment, the image of the display unit 11 is once reflected on a mirror 1a prior to entering the optical system 12 for the purpose or reducing a size of the HUD unit in the vertical direction of the dash board.

Referring to FIG. 18 which shows details of the operation of the prism 30, light beam $K_L$ entering the left eye prior to correction is reflected at a reflective point B located below a reflective point A of light beam $K_R$ entering the right eye. The angle $\theta$ formed between both the light beams after reflection means the binocular parallax in the vertical direction.

Figure 19:
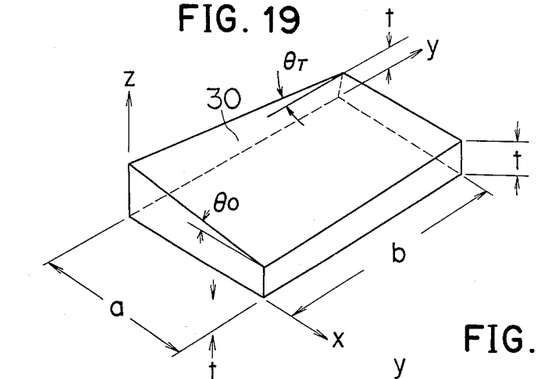
FIG. 19 is a perspective view of the prism shown in FIG. 17.

As shown in FIG. 19, the prism 30 is of a sectional shape such that an upper surface only is inclined and a portion on a front side of the vehicle body is thicker than that on a rear side thereof. Further, the prism 30 has different vertical angles such that the vertical angle on the left side where the light beam entering the left eye passes is larger, while the vertical angle on the right side where the light beam entering the right eye passes is smaller. Thus, the upper surface of the prism 30 is curved.

When the virtual image of the dispaly image is projected through the prism 30 under the conditions set forth in conjunction with FIGS. 5 and 6, the light beam entering the left eye is moved as shown by $K_L'$.

The section of the prism 30 shown in FIG. 18 is a section where the light beam $K_L$ entering the left eye passes. On the other hand, the light beam $K_R$ entering the right eye passes through a section of the prism 30 present on a back side of the drawing (corresponding to a right-hand side of the vehicle body). The vertical angle of the prism 30 at the section where the light beam $K_R$ passes is smaller, and the light beam $K_R$ passes at the substantially same position as with the case that the correction by the prism is not carried out. On the other hand, the light beam $K_L'$ passes through the section having a larger vertical angle, and is refracted by the correction angle $\theta$. Then, the light beam $K_L'$ is reflected at a point B' present at the same level as of a reflective point A of the light beam $K_R$.

Thus, both the light beams $K_L'$ and $K_R$ entering the left and right eyes advance on a horizontal plane envolving both the eyes by the operation of the prism, thereby eliminating the binocular parallax in the vertical direction and obtaining a clear display image. However, since a tilt angle of the light beam $K_L'$ is different from that of the light beam $K_R$ prior to reflection on the windshield glass, a direction of a perpendicular $B_v$ at the reflective point B' is naturally different from that of a perpendicular $A_v$ at the reflective point A.

Referring to FIG. 19 which shows an example of the prism used for the purpose of eliminating the binocular parallax of 0.49°, a width b of the prism 30 is about 130 mm, and a depth a is about 53 mm in consideration of an aspect ratio of the display image, provided that an effective diameter $\phi$ is 120 mm, and a horizontal distance between both the reflective points A and B is 1.80 times 66.5 mm. Assuming that a bottom surface of the prism 30 is perpendicular to the light axis of the optical system 12, a thickness t is 1.0 mm, and a refractive index n of the prism 30 made of glass is 1.492.

A necessary refractive angle with respect to a maximum vertical angle $\theta_0$ on the x-axis and the refractive index n in FIG. 19 is as follows:

$$\theta = \sin^{-1}(n \cdot \sin \theta_0) - \theta_0 (= 0.49°) \quad (12)$$

An angular change $\theta_T$ in a longitudinal direction of the prism 30 is $\theta_T = \theta_0/1.80$, $\theta_0$, and Equation (12) is modified to obtain $$\tan\theta_0 = \frac{\sin 0.49°}{n - \cos 0.49°}$$
$$= \frac{\sin 0.49°}{1.492 - \cos 0.49°}$$

Hence, $\theta_0 = 1.0°$ and $\theta_T = 0.56°$ are obtained.

A height (thickness) z of the prism 30 is represented as follows:

$$z = (a - x) \cdot \tan\left\{\frac{b - y}{b} \cdot \theta_0\right\} + t \quad (13)$$

The aforementioned dimensions and angle are substituted in Equation (13) to obtain $$z = (53 - x) \cdot \tan\left\{\left(1 - \frac{y}{130}\right) \times 1°\right\} + 1.0 \quad (14)$$

Figure 20:
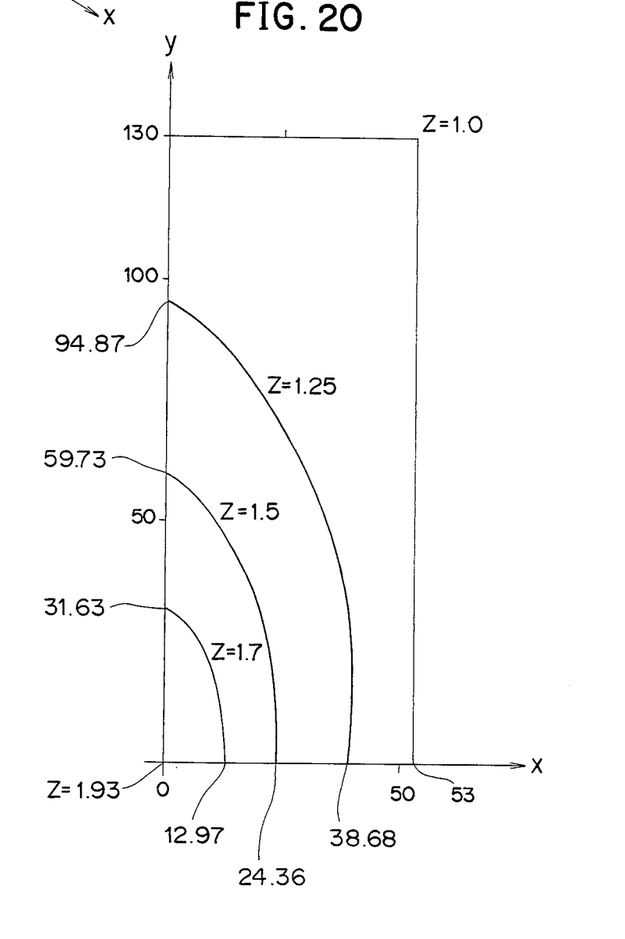
FIG. 20 is a graph showing a shape of the prism shown in FIG. 17.

FIG. 20 shows a contour of the height z of the prism on the x-y plane according to Equation (14). As is apparent from FIG. 20, the upper surface of the prism 30 is curved in such a manner that a left front portion is thick, while a right rear portion is thin.

In this way, when the display image is obliquely reflected in the course of HUD—windshield glass—driver's dyes, the binocular parallax in the vertical direction may be eliminated to enable the driver to visibly perceive a high-quality display image without eye strain. Although curvature of the windshield glass is not taken into consideration in FIGS. 19 and 20, the curvature may be reflected on the shape of the prism to obtain a display image with no parallax in the case that the windshield glass is curved, and especially, it is largely curved in a transverse direction.

Further, although the mirror 1a is provided between the display unit 11 and the optical system 12 in the foregoing preferred embodiment shown in FIG. 17, the display unit 11 may be located on the light axis of the optical system 12 without providing the mirror 1a.

Additionally, the aforementioned preferred embodiment employs a single convex lens for the optical system 12, a combination lens formed by combining a plurality of lenses may be of course used for the optical system 12.

It is further noted that an angle formed by light beams of the virtual image to enter the windshield is rendered less than a monocular resolving power on an assumption that the thickness of the windshield glass is constant in the above embodiment whereas the effect of rendering said angle may be obtained by making the windshield glass thinner.

What is claimed is:

1. An on-vehicle head-up display apparatus wherein a winshield glass having inner and outer surfaces of a vehicle is utilized as a catoptric system to reflect an image of various information on the vehicle from said inner surface of the windshield glass, comprising:

display means for indicating said information;
   first optical means for forming a virtual image of said information displayed on said display means; and
   second optical means positioned between said first optical means and said windshield glass, for correcting parallax of said virtual image reflected on said inner surface of said windshield glass, in a vertical direction.

2. The on-vehicle head up display apparatus as defined in claim 1, wherein said second optical means comprises a prism.

* * * * *